(12) United States Patent
Nemirovsky et al.

(10) Patent No.: US 7,571,270 B1
(45) Date of Patent: Aug. 4, 2009

(54) MONITORING OF SHARED-RESOURCE LOCKS IN A MULTI-PROCESSOR SYSTEM WITH LOCKED-RESOURCE BITS PACKED INTO REGISTERS TO DETECT STARVED THREADS

(75) Inventors: Mario Nemirovsky, Saratoga, CA (US); Enrique Musoll, San Jose, CA (US); Jeffrey Huynh, Cambell, CA (US)

(73) Assignee: Consentry Networks, Inc., Milpitas, CA (US)

( * ) Notice: Subject to any disclaimer, the term of this patent is extended or adjusted under 35 U.S.C. 154(b) by 183 days.

(21) Appl. No.: 11/564,609

(22) Filed: Nov. 29, 2006

(51) Int. Cl.
*G06F 13/14* (2006.01)
*G06F 12/00* (2006.01)
*G06F 13/38* (2006.01)

(52) U.S. Cl. ...................... 710/240; 710/200
(58) Field of Classification Search ................. 710/240, 710/244, 200, 107, 220
See application file for complete search history.

(56) References Cited

U.S. PATENT DOCUMENTS

| | | | |
|---|---|---|---|
| 4,882,669 A | 11/1989 | Miura et al. | |
| 4,890,285 A | 12/1989 | Dichiara | |
| 5,450,576 A | 9/1995 | Kennedy | |
| 6,151,655 A * | 11/2000 | Jones et al. | 710/244 |
| 6,880,028 B2 * | 4/2005 | Kurth | 710/240 |
| 7,000,047 B2 * | 2/2006 | Nguyen et al. | 710/200 |
| 7,065,596 B2 * | 6/2006 | Kulick et al. | 710/240 |
| 7,069,366 B2 * | 6/2006 | Posner et al. | 710/200 |
| 7,162,557 B2 * | 1/2007 | Takeda et al. | 710/240 |
| 7,174,406 B1 * | 2/2007 | Abdallah et al. | 710/240 |
| 7,257,814 B1 * | 8/2007 | Melvin et al. | 718/104 |
| 7,500,035 B2 * | 3/2009 | Johns et al. | 710/113 |
| 2002/0004886 A1 | 1/2002 | Hagersten et al. | |
| 2003/0079072 A1 * | 4/2003 | Takeda et al. | 710/113 |
| 2003/0145146 A1 * | 7/2003 | Posner et al. | 710/200 |
| 2004/0068597 A1 * | 4/2004 | Kulick et al. | 710/240 |
| 2004/0088523 A1 | 5/2004 | Kessler et al. | |
| 2004/0172221 A1 | 9/2004 | Curry, III | |

(Continued)

OTHER PUBLICATIONS

Hyunh, J. "LSP-II Tribe Programmer's Reference Manual" rev 2.1, Oct. 3, 2006, pp. 1-8, 11-12, 22-34, 49-50, 56.

(Continued)

*Primary Examiner*—Ryan M Stiglic
(74) *Attorney, Agent, or Firm*—Stuart T. Auvinen; gPatent LLC

(57) ABSTRACT

A resource-lock monitor detects when processors in a multi-processor system are stuck waiting for access to a shared resource. A lock-monitor register has a lock bit and a sticky-lock bit for each processor being monitored. The lock and the sticky-lock bits are both set when the processor executes a lock instruction that also sends a lock-request to a resource arbiter. The lock bit is cleared when the resource arbiter grants access to the processor, but the sticky-lock bit remains set until sticky-lock bits are cleared by monitoring software at the end of a monitoring period. At the end of each monitoring period, monitoring software reads the lock and sticky-lock bits and finds a locked processor when a processor's lock bit is still set, but its sticky-lock bit is cleared. When the locked processor remains locked at the end of another monitoring period, an error handler resets the locked processor.

8 Claims, 12 Drawing Sheets

U.S. PATENT DOCUMENTS

| | | |
|---|---|---|
| 2004/0210800 A1 | 10/2004 | Ghislain Gabriel Vecoven et al. |
| 2005/0015672 A1 | 1/2005 | Yamada |
| 2005/0108455 A1* | 5/2005 | Miller et al. ................. 710/113 |
| 2005/0223302 A1 | 10/2005 | Bono |
| 2006/0195508 A1 | 8/2006 | Bernardin et al. |
| 2008/0071955 A1* | 3/2008 | Johns et al. ................. 710/113 |

OTHER PUBLICATIONS

Hyunh, J. "LSP-I Tribe Programmer's Reference Manual" rev 2.1, Oct. 3, 2006, pp. 1-15, 21-22.

* cited by examiner

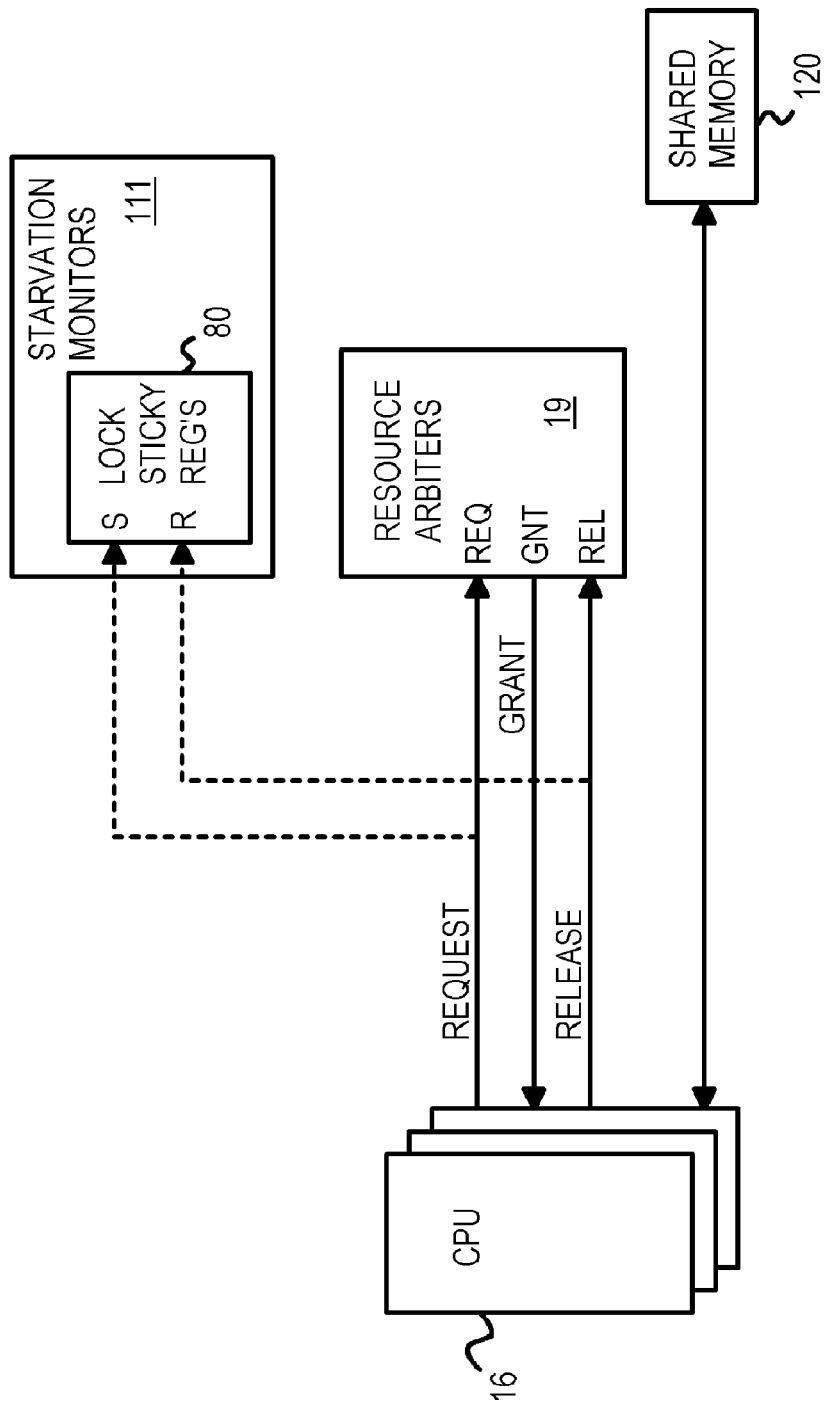

MONITORING OF SHARED-RESOURCE LOCKS IN A MULTI-PROCESSOR SYSTEM WITH LOCKED-RESOURCE BITS PACKED INTO REGISTERS TO DETECT STARVED THREADS

FIELD OF THE INVENTION

This invention relates to multi-processor systems, and more particularly to starved resource-access detection.

BACKGROUND OF THE INVENTION

Improving process and design technologies have enabled many processors to be integrated together onto a same silicon integrated-circuit chip. The many processors may work together to accomplish complex processing tasks, such as examining and operating on Internet-Protocol (IP) packets that pass through a server, router, or other network device. Each processor may operate on a different IP packet, allowing a processing throughput of hundreds of IP packets in parallel at a same instant in time.

FIG. 1 is a block diagram of a packet processor. Such a packet processor has been developed and has been on-sale for more than one year by the Applicant and is marketed as the LANShield Processor I.

Packet-transfer memory 40 is on-chip and contains memory that stores incoming and outgoing packets from packet interface 20. Control interface 22 may also read and write data streams in packet-transfer memory 40.

The many processors are arranged into groups or clusters of processors known as tribes. Four multi-processor tribes 10 each have 32 processors 16 that access packets and scratch-pad data in packet-transfer memory 40. Thread controller 18 in each of multi-processor tribes 10 assigns processing loads among processors 16 within that tribe 10. Thread controller 18 receives new processing work from central packet-transfer controller 42, and sends the processing information such as pointers and initial register values to one of processors 16 to launch a new thread of the processing workload.

During thread execution, processors 16 may access local memory 34 through memory controller 32. Local memory 34 may be external DRAM or other kinds of memory for use by each of multi-processor tribes 10. Processors 16 may also access packet-transfer memory 40, such as to read headers of incoming IP packets that were received by packet interface 20 and initially written into packet-transfer memory 40.

Central packet-transfer controller 42 receives processor requests to access packet-transfer memory 40, and arbitrates among these requests, as well as requests from packet interface 20 and control interface 22. Other control functions such as ordering packets and control transfers to and from processors 16 through thread controllers 18 may be handled by central packet-transfer controller 42 or by other logic not shown. Active and sticky bits are used to detect when one of processors 16 is stalled for an unusual reason, such as executing a continuous loop of instructions, which might occur after executing defective program code or reading an illegal or out-of-bounds parameter value. Detection of a stuck processor 16 occurs when the active bit is still set, but the sticky bit, which is periodically cleared, is in the cleared state.

While useful, such stuck-processor detection may not detect some other kinds of starved or error conditions, such as occur when processors arbitrate for access to shared resources. For example, a processor may request access to packet-transfer memory 40, yet for some reason never be granted access to packet-transfer memory 40. The processor waits for an excessively long period of time for access to packet-transfer memory 40, perhaps due to an arbitration failure. Another processor may hold the lock to a certain location in memory, such as a semaphore, and not release the lock, preventing the current processor from being granted access to that memory location or semaphore. The current processor may be starved by another aggressive user of the same resource. It is still able to execute instructions, but not able to access the requested semaphore in the shared memory. The current processor may continue to execute instructions to poll the semaphore, yet not make forward progress on its true workload. The stuck-processor detection cannot determine which is the aggressor processor and which resource is the source of contention.

Another condition that cannot be detected is an error condition brought on by a processor that for some reason failed to release a lock before it deactivates itself. The stuck-processor detection would see this processor deactivate, and therefore is not stuck, and see other processors as stuck but provide no more information.

What is desired is a starvation detection system that can detect lock-outs from shared resources such as shared memory or semaphores, shared buses, system or global registers, descriptors, and shared I/O. A method to easily monitor arbitration status to shared resources for many processors is desirable. Simple but accurate detection of starved or locked-out resources is desirable in a multi-processor system.

BRIEF DESCRIPTION OF THE DRAWINGS

FIGS. 9A-C show alternative set and reset signals to the lock registers that are taken from various arbitration signals.

DETAILED DESCRIPTION

The present invention relates to an improvement in starvation detection for multi-processor shared resources. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2:
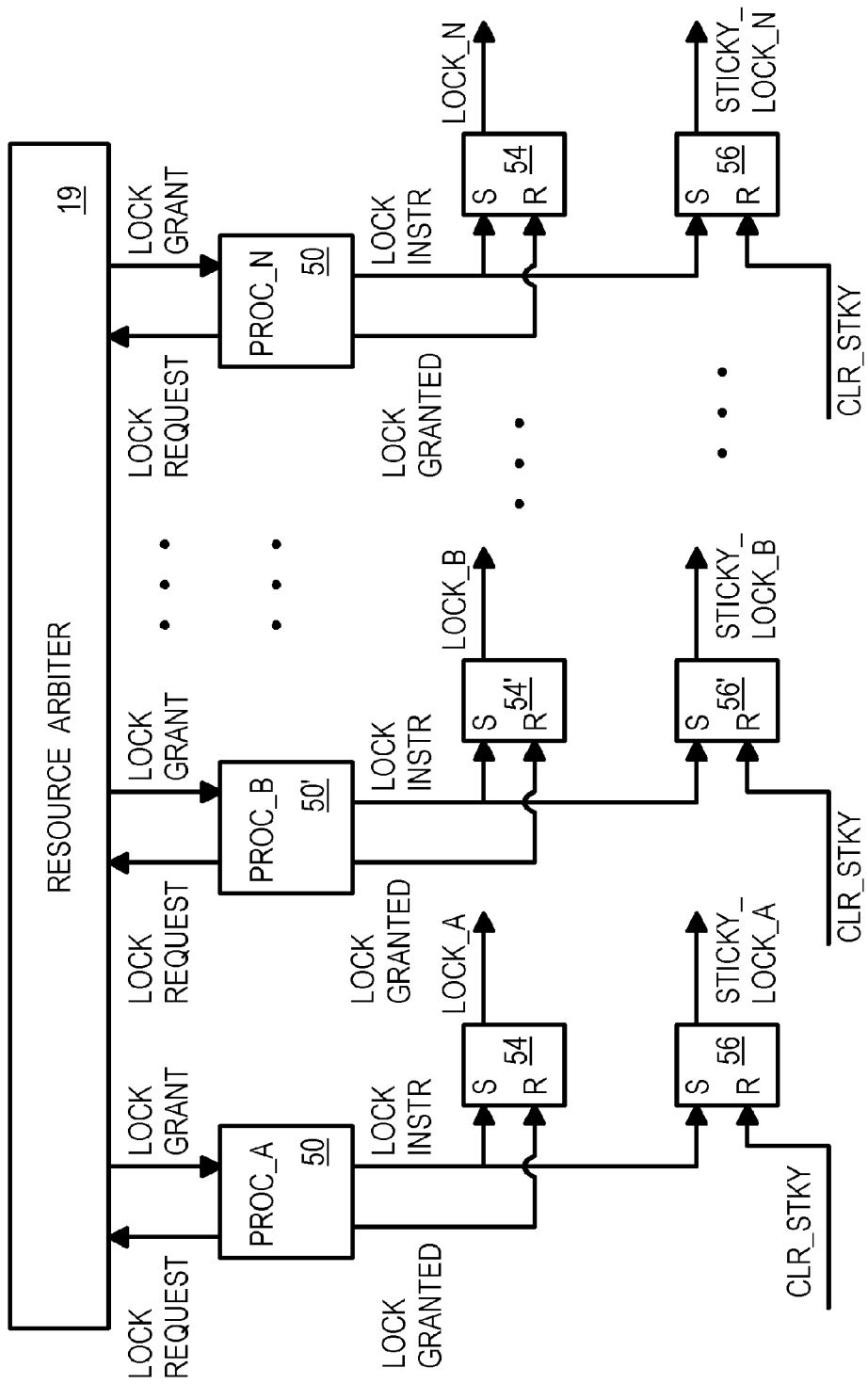
FIG. 2 is a block diagram of generation of resource-lock monitoring bits for multiple processors.

FIG. 2 is a block diagram of generation of resource-lock monitoring bits for multiple processors. Resource arbiter 19 controls access by many processors 50, 50' to a shared resource. The shared resource may be a shared memory, semaphore, global register, descriptor table, a shared bus, shared I/O, or other shared resource in a multi-processing system. Resource arbiter 19 may control access to all these shared resources with separate parallel arbiters or with a combined arbiter, or several resource arbiters 19 may be present.

Processors 50, 50' request access to the shared resource controlled by resource arbiter 19 by sending a lock request to resource arbiter 19. Resource arbiter 19 then arbitrates access to the shared request among all the processors requesting access to that shared resource, such as by using round-robin, priority, or a variety of combinations of arbitration techniques. When resource arbiter 19 is ready to grant access to requesting processor 50', a lock grant is returned from resource arbiter 19 to requesting processor 50'. Requesting processor 50 may then access the shared resource, and when access is finished, requesting processor 50 can release the lock, such as by de-asserting its lock request. Resource arbiter 19 may then grant access of this resource to another processor 50.

Problems may occur when arbitrating access to the shared resource. Another processor 50 may hold the lock too long, preventing other processors 50 from being granted the lock. Resource arbiter 19 may fail in various ways, or may produce unexpected results, such as ignoring a valid lock request. For example, a lock request may not be latched into a register in resource arbiter 19 due to a timing problem.

Lock monitoring is performed to detect these and other kinds of resource-lock problems. Registers 54, 56 are provided, with two monitor bits for each of processors 50. Registers 54, 56 may be periodically read by system software to search for resource-lock errors.

Registers 54, 56 may be set-reset registers, or clocked J-K registers, or other kinds of resetable registers. When requesting processor 50 executes a program that accesses the shared resource, a lock instruction is executed by requesting processor 50. As part of the execution of the lock instruction, a set signal is generated to the set input of registers 54', 56' for requesting processor 50. These two bits are both set to 1 by execution of the lock instruction. The lock instruction may perform other tasks, such as generating the lock request to resource arbiter 19, and blocking further execution in the processor until it receives a resource-grant signal.

Once resource arbiter 19 responds to the lock request by sending the lock grant to requesting processor 50, the lock grant is passed on to the reset input of register 54'. The lock grant clears the lock bit in register 54'. However, the sticky lock bit in register 56' remains set. Eventually, after sampling of the lock and sticky-lock bits, a system monitor clears sticky-lock bits that are read as 1 in registers 56 by activating clear sticky signals that are applied to reset inputs of registers 56. Clearing of the sticky-lock bits can be performed periodically, such as every millisecond or the maximum time that a resource is expected to be locked by a processor.

A system monitor may read all of the lock bits in registers 54 during the sampling stage to determine which of processors 50 are waiting to be granted access to the shared resource. The lock bits in registers 54 may be packed together into one or more words that can be read by the system monitor, such as a pair of 32-bit register words that can be read in two read-access instructions executed by system-monitor software. Each 32-bit register could indicate the lock status of up to 32 processors 50.

The system monitor may further read all of the sticky-lock bits in registers 56 during the sampling stage. While the lock bits in registers 54 indicates the current lock status of each processor 50, the sticky-lock bits in registers 56 can also indicate the prior lock status: when the processor had requested the lock anytime since the last clear-sticky was generated.

Normally, lock bits are reset when locks are granted, and the sticky-lock bits that are set are cleared after every monitoring period of time. However, when a waiting processor's lock is not granted but is still pending when the clear-sticky signal is generated, the waiting processor's sticky-lock bit will be cleared, but its lock bit remains set. The system monitor may detect this 1-0 condition of the lock and sticky-lock bits, and may either determine that the waiting processor is starved or place these waiting processors on a list of waiting processors. When the next sampling stage occurs after a second period of time, and the lock bits is still set, the waiting processor is determined to be a starved processor. Special starvation handling procedures may be initiated to resolve the starvation and fix the problem.

The starved condition is thus detected by the 1-0 condition of the lock and stick-lock bits for one or more consecutive monitoring periods. The monitoring period may be set to a reasonably long period of time to eliminate or reduce false starvation detections. In addition, waiting for one or more consecutive 1-0 readings can eliminate false detections.

Figure 3:
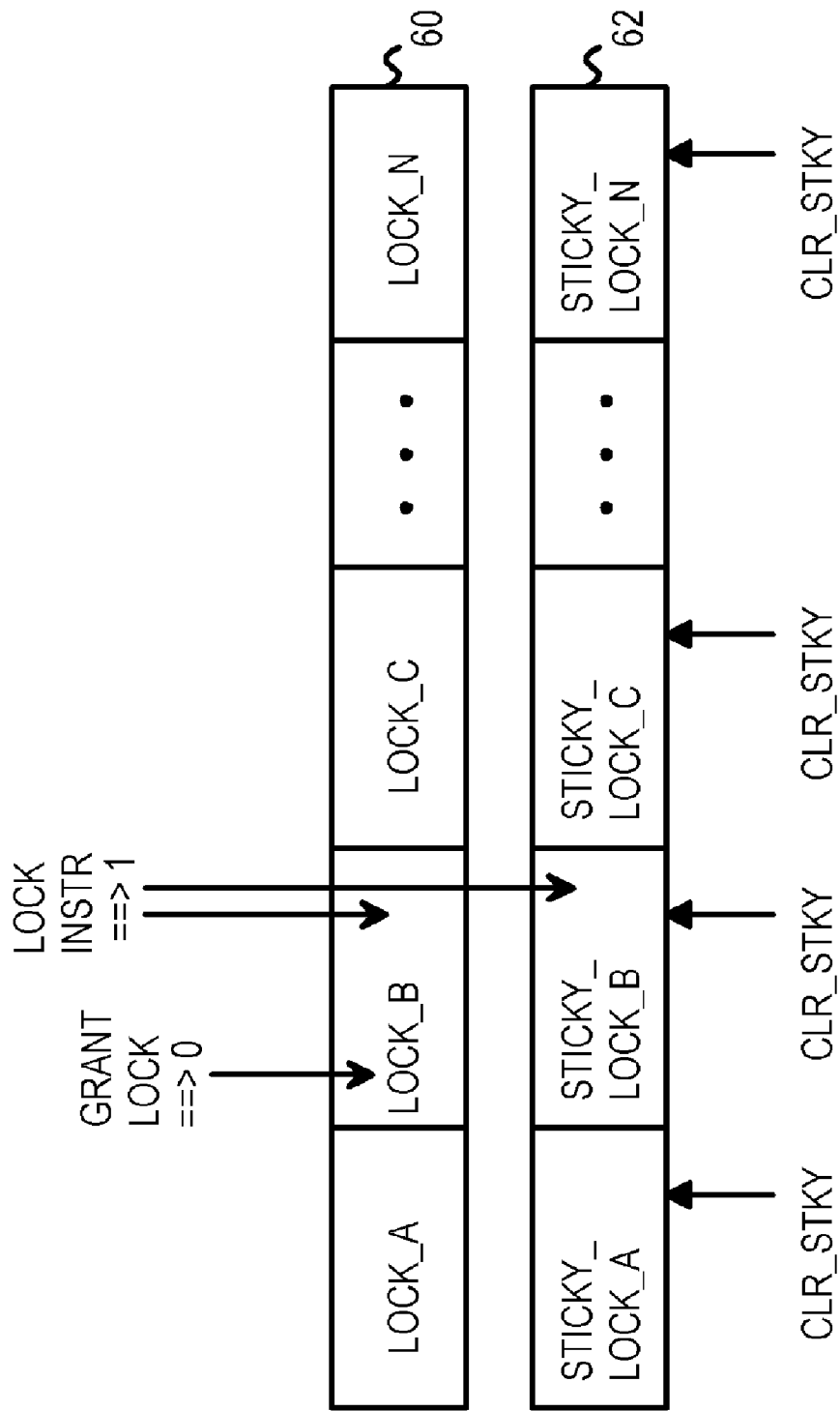
FIG. 3 shows lock and sticky-lock bits packed into registers read by resource-lock monitoring software.

FIG. 3 shows lock and sticky-lock bits packed into registers read by resource-lock monitoring software. Lock-Monitor register 60 contains lock bits LOCK_A, LOCK_B, LOCK_C, . . . LOCK_N for processors A, B, C, . . . N. The lock bit LOCK_X for processor X in register 60 is set when processor X executes a lock instruction, and reset when the lock is granted and received by processor X.

Sticky-lock-Monitor register 62 contains sticky-lock bits STICKY_LOCK_A, STICKY_LOCK_B, STICKY_LOCK_C, . . . STICKY_LOCK_N for processors A, B, C, . . . N. The sticky-lock bit STICKY_LOCK_X for processor X in register 62 is set when processor X executes a sticky-lock instruction, and reset when the clear-sticky signal is generated by the system's lock monitor.

While individual lock and sticky-lock bits are set in registers 60, 62 as each processor executes a lock instruction, and lock bits in register 60 are individually cleared by the lock grant for a particular processor, individual sticky-lock bits are cleared by the clear-sticky signals from the central lock monitor based on the sampled state of sticky-lock bits.

Registers 60, 62 may be read by lock-monitoring software executing a read or input instruction. The lock status of many processors may be quickly monitored by reading the multiple lock bits in register 60, or the multiple sticky-lock bits in register 62. For example, the status of 32 processors could be checked by reading pair of 32-bit registers 60, 62.

Figure 4:
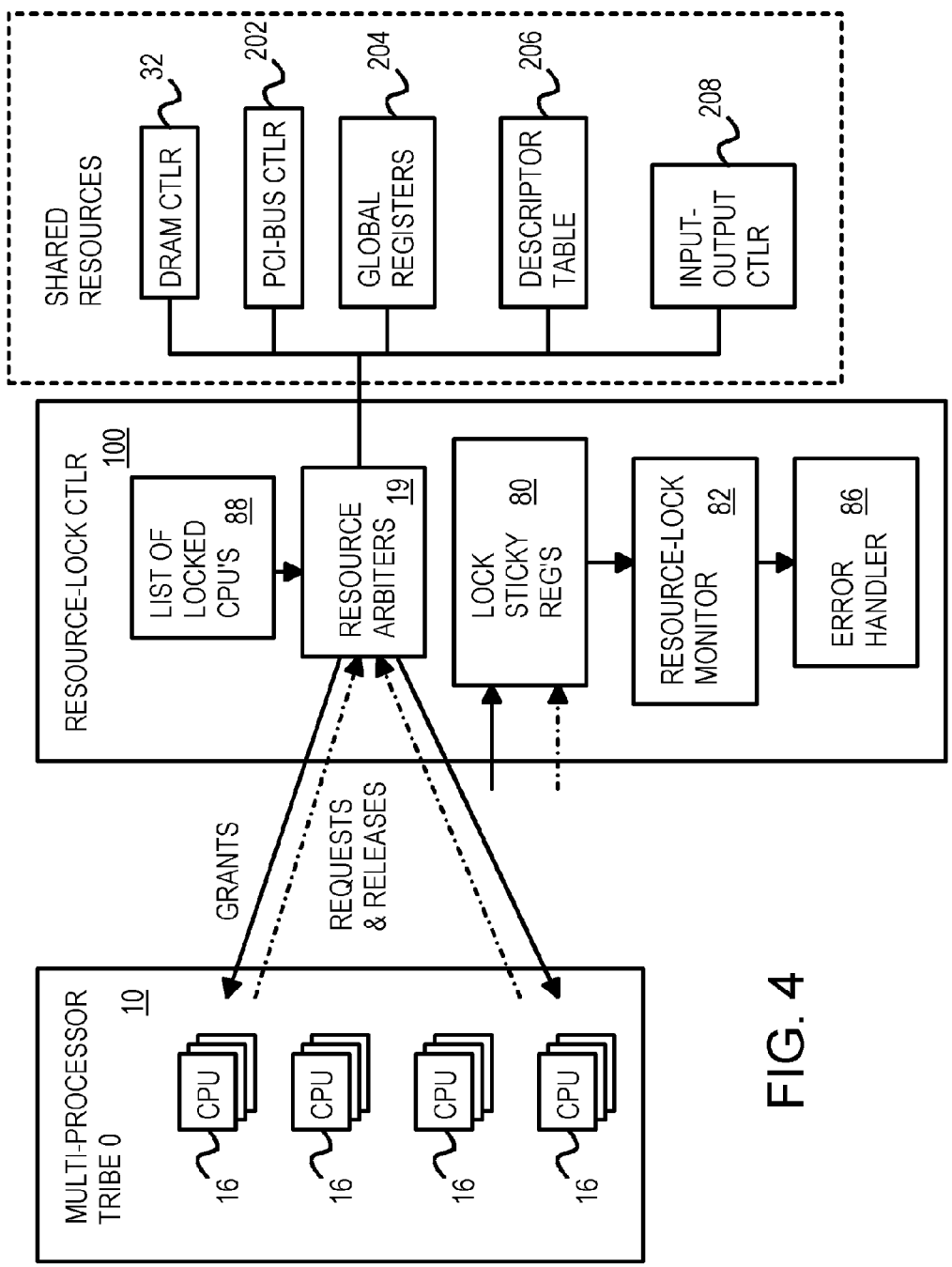
FIG. 4 is a block diagram of a resource-lock controller that monitors lock and sticky-lock registers to detect resource-starved processors.

FIG. 4 is a block diagram of a resource-lock controller that monitors lock and sticky-lock registers to detect resource-starved processors. Resource-lock controller 100 monitors processors 16 in one multi-processor tribe 10. Resource arbiter 19 receives lock requests from processors 16 and sends back lock grants after arbitration. Processors 16 receiving the lock-grant may then access the granted shared resource. The shared resource may be a shared memory controlled by memory controller 32, a peripheral device on a Peripheral Component Interconnect (PCI) or other kind of bus that is controlled by PCI-bus controller 202, system or global registers 204, fields in descriptor table 204, or input or output through I/O controller 208.

Lock registers 80 in resource-lock controller 100 include lock bits for each of processors 16 that are set when the processor executes a lock instruction, and reset when resource arbiter 19 grants access to the shared resource. Lock registers 80 also include sticky-lock bits that are individually set by execution of the lock instruction, and are individually reset by the sticky-clear signals that are periodically generated by resource-lock monitor 82 based on the state of the sticky-lock bits during the sample stage.

Resource-lock monitor 82 may be a dedicated processor, or one of processors 16 that is assigned to execute a lock monitor routine. Resource-lock monitor 82 could also be firmware or dedicated logic, or some combination. Resource-lock monitor 82 executes periodically, such as every 1 millisecond, and reads or samples the lock and sticky-lock bits in lock registers 80. Processors having the lock bit set but the sticky-lock bit cleared are added to watch list 88, which contains a list of possibly locked processors. Processors that remain on watch list 88 for one or more consecutive executions of resource-lock monitor 82 have been locked for more than one monitoring period and can be considered to be resource starved. Resource-lock monitor 82 then activates error handler 86 to handle the starvation of that processor on watch list 88.

Error handler 86 removes the processor from watch list 88. Error handler 86 may reset the processor and restart the processor's thread, or may have the processor re-execute the lock instruction, or may have the processor skip the lock instruction, or reduce the aggressive processor's priority, or use other means to resolve the starvation condition. Resource arbiter 19 may also be reset by error handler 86.

Figure 5:
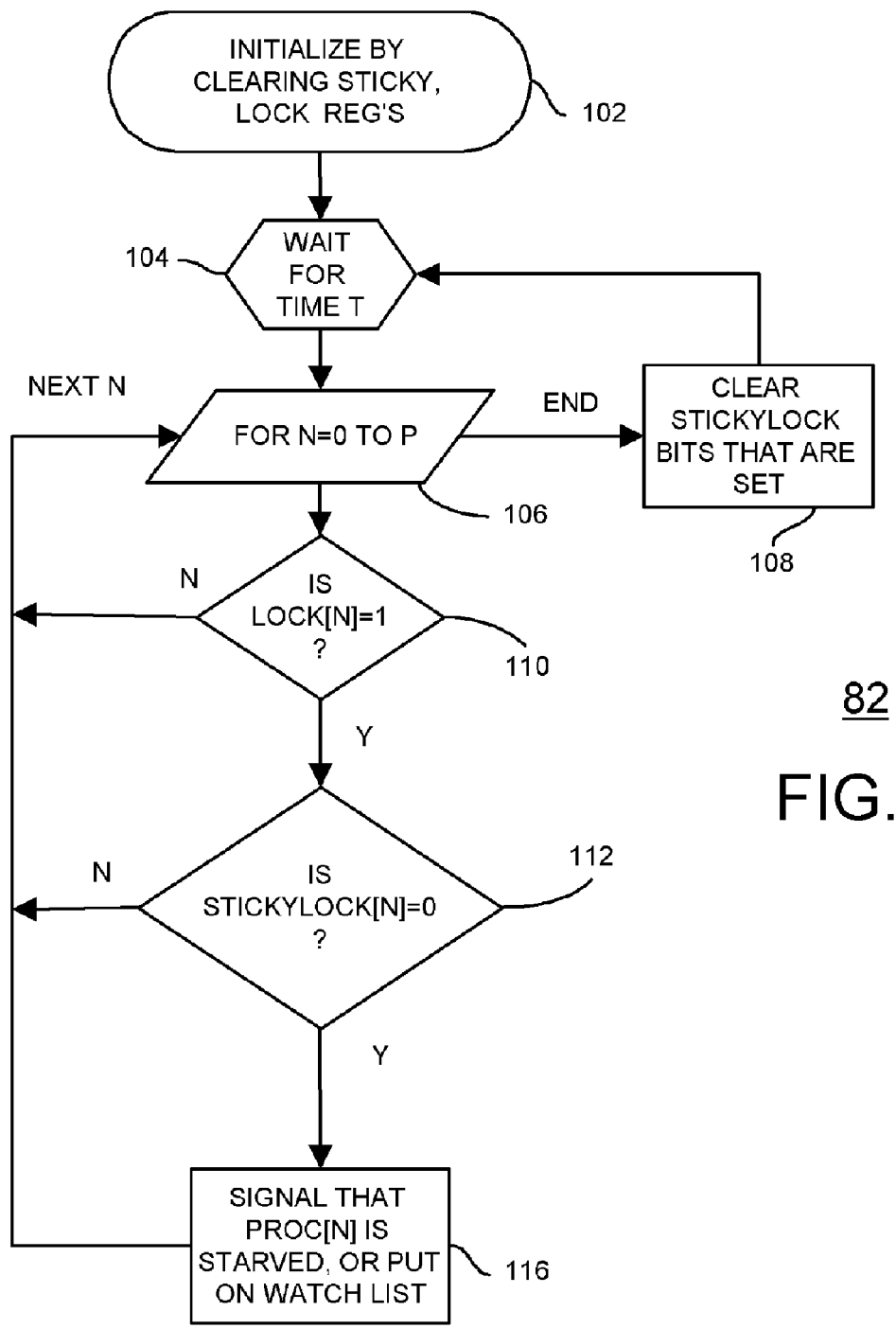
FIG. 5 is a flowchart of steps taken by a resource-lock monitor.

FIG. 5 is a flowchart of steps taken by resource-lock monitor 82. Lock registers 80 in resource-lock controller 100 (FIG. 4) are initialized by clearing all lock and sticky-lock bits, step 102. Monitoring is performed after each period of time T, step 104. Time T may be a relatively long period of time, such as 1 millisecond, 100 microseconds, or some other value and may be programmable.

At each monitoring time-point after time T, each processor N is monitored by stepping variable N through from 0 to P, when there are P+1 processors to be monitored, step 106. For each processor N, the lock and sticky-lock bits are read or sampled for that processor. When the processor's lock bit LOCK[N] is 0, step 110, then the processor is not resource-locked. The next processor can be examined, step 106.

When the processor's lock bit is set, step 110, but its sticky-lock bit is also set, step 112, then the processor has been locked for less than time T. The processor may be operating normally. The next processor can be examined, step 106.

When the processor's lock bit is set, but its sticky-lock bit is cleared, steps 110, 112, then the 1-0 condition has been detected and the lock bit has been set for at least time T-S, where T is the time between sampling events, and S is the time between the sampling event and the sticky-lock clearing event. Resource-lock monitor 82 either signals that this processor is starved or puts this processor in the monitor watch list to track an additional period of 1-0 condition, step 116. After a processor is determined to be starved, error handler 86 may be activated to unlock the processor.

Once all processors' lock and sticky-lock bits have been examined, step 106, clear-sticky signals are activated to clear those sticky bits that are read as set, step 108. Monitoring is complete until the next time T has passed, step 104 and monitoring is repeated.

Figure 6A:
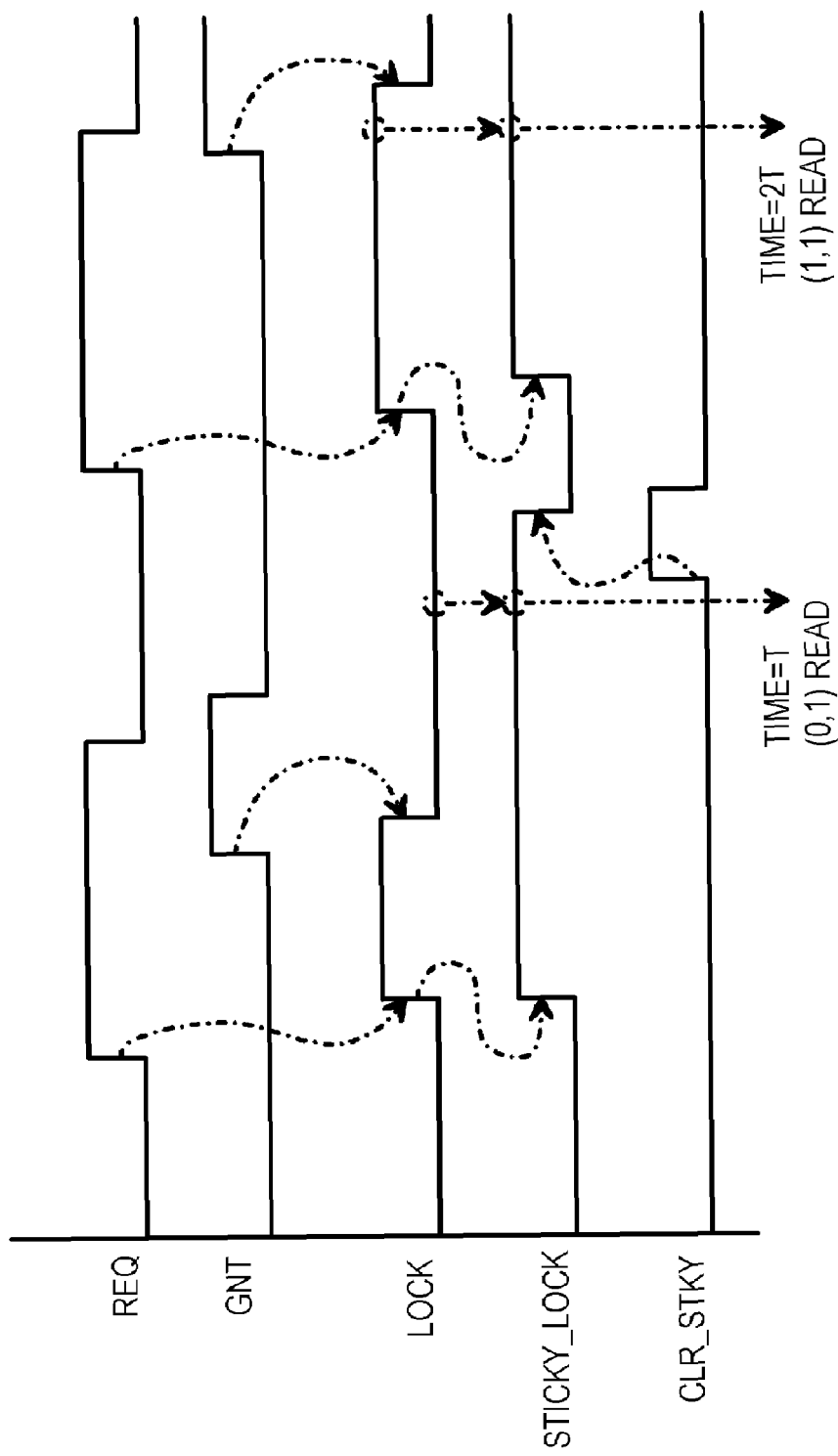
FIGS. 6A-B are timing diagrams highlighting resource starvation detection.
Figure 6B:
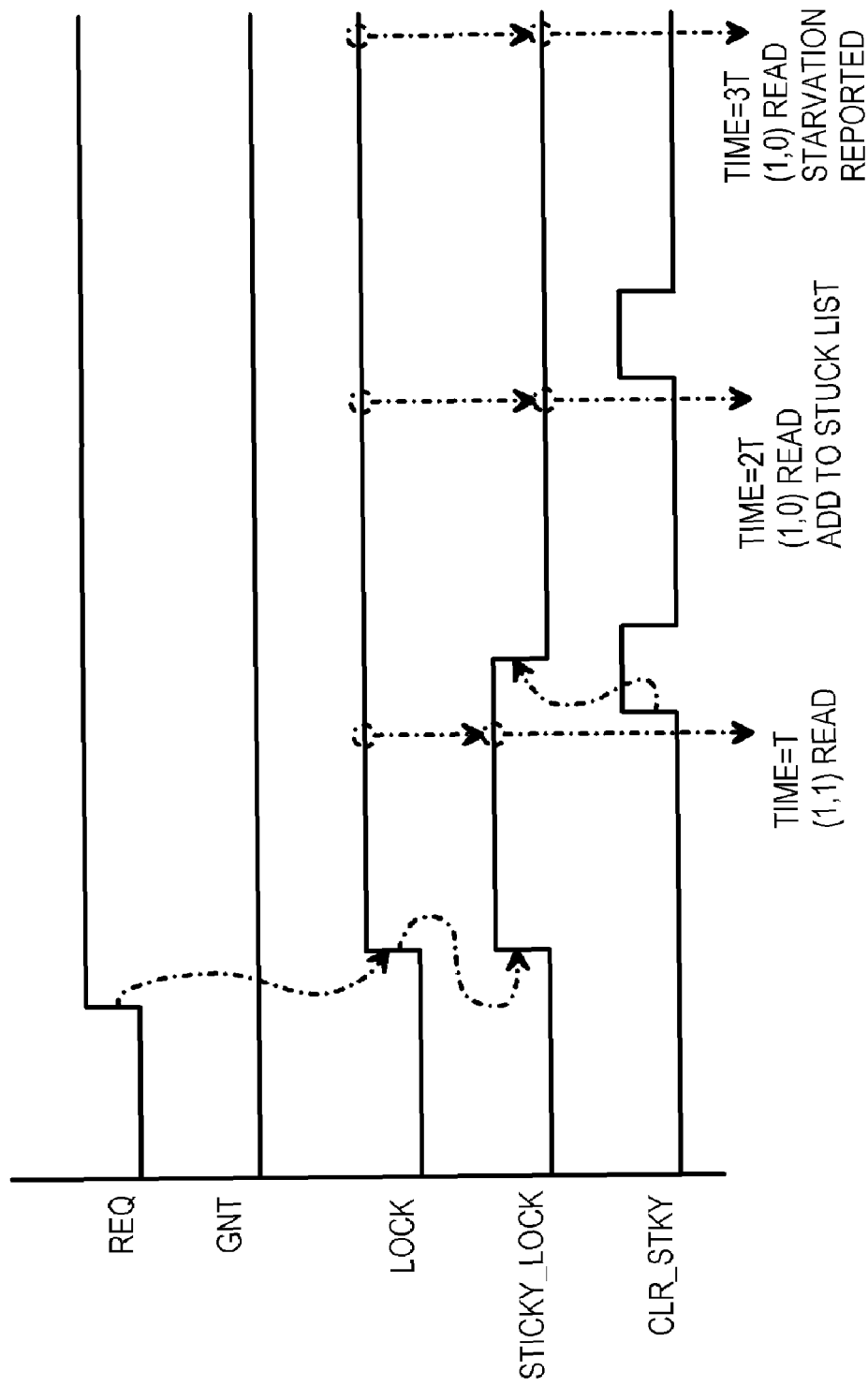

FIGS. 6A-B are timing diagrams highlighting resource-starvation detection. In FIG. 6A, a processor requests access to a shared resource by driving request line REQ high. The processor's lock and sticky-lock bits are both driven high by execution of a lock instruction that occurs at about the same time or within a few instructions of the request REQ being generated by the processor.

In response to request REQ, the resource arbiter performs arbitration and drives grant line GNT high when the requesting processor is granted access. The grant may not occur immediately, as another processor may have locked the shared resource and has not yet finished accessing the shared resource. Once the requesting processor received the grant GNT, it accesses the shared resource and then releases the resource by driving its request line REQ low. The resource arbiter responds to the release by driving the grant line GNT low.

The lock bit is cleared when the processor receives the grant, which occurs in response to the grant line GNT going high. The sticky-lock bit remains high until the next clear-sticky signal is activated, at the end of each time period T.

In FIG. 6A, the lock and stick-lock bits are read as 0,1 after the successful completion of a request-grant cycle. The clear-sticky pulse occurs after reading the lock and sticky-lock bits because the sticky-lock bit is set, clearing the sticky-lock bit. One, two, or more request-grant cycles could occur during any monitoring period T.

In FIG. 6B, a resource starvation occurs. The request REQ goes high and the lock and sticky-lock bits are set in response to execution of the lock instruction by a processor. However, the arbiter never grants access to the processor. The grant line remains low for too long.

At the first monitoring time T, the lock and sticky-lock bits are read as 1,1. This is a normal reading when the processor is waiting for the grant. The clear-sticky signal is pulsed to clear the sticky-lock bit because the sticky-lock bit is read as 1.

At the next monitoring time-point, at time 2T, the lock and sticky-lock bits for this processor are read as 1,0. This is the error condition. The processor is added to the watch list. The clear-sticky signal is not pulsed.

At the third monitoring time-point, at time 3T, the lock and sticky-lock bits for this processor are again read as 1,0. This is still the error condition. The error condition has been detected for the last two monitoring time-points, at time 2T and time 3T. The processor is already on watch list 88 (FIG. 4), so the processor is confirmed to be starved for time 2T-S. Error handler 86 (FIG. 4) can be activated to fix the starvation or reset the processor, or enter debug mode, or other actions necessary to allow forward progress.

Figure 7:
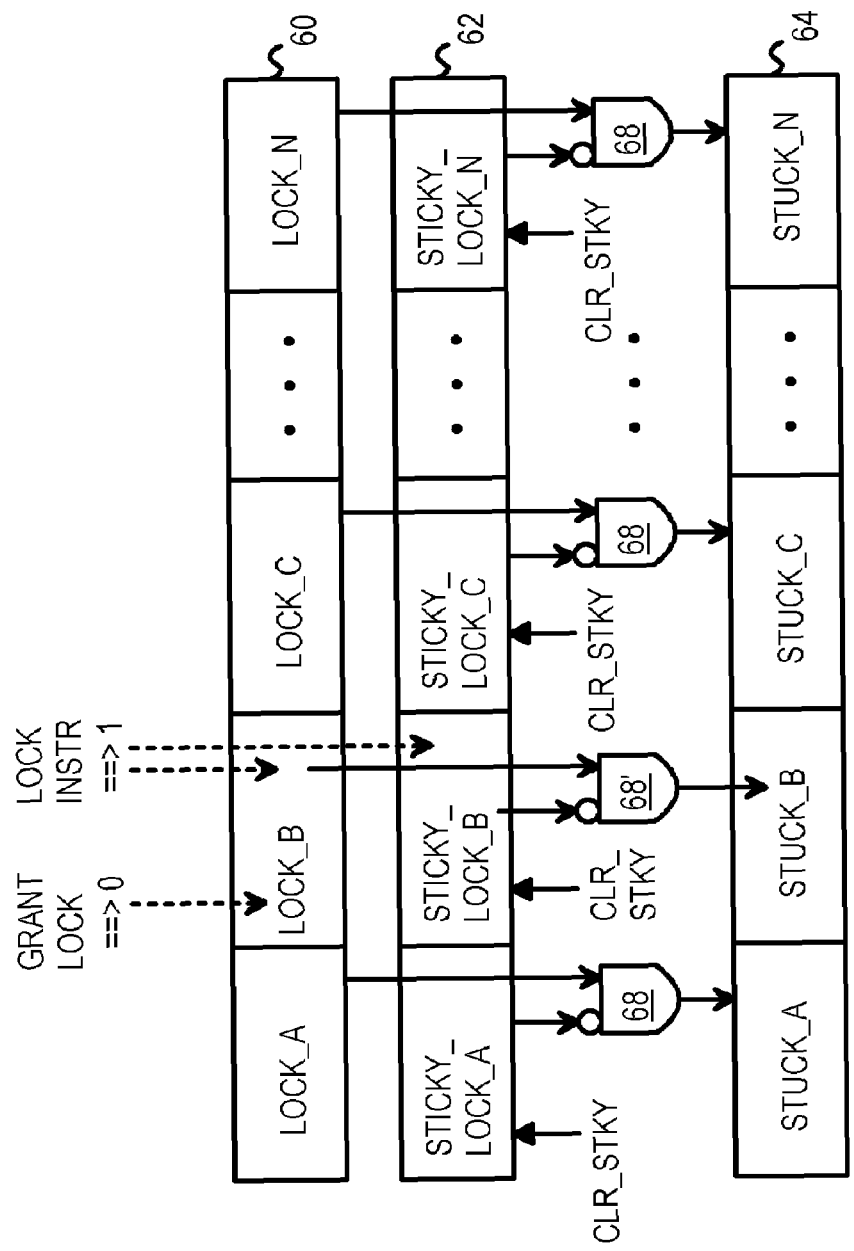
FIG. 7 shows stuck, lock, and sticky-lock bits packed into registers read by streamlined resource-lock monitoring software.
Figure 8:
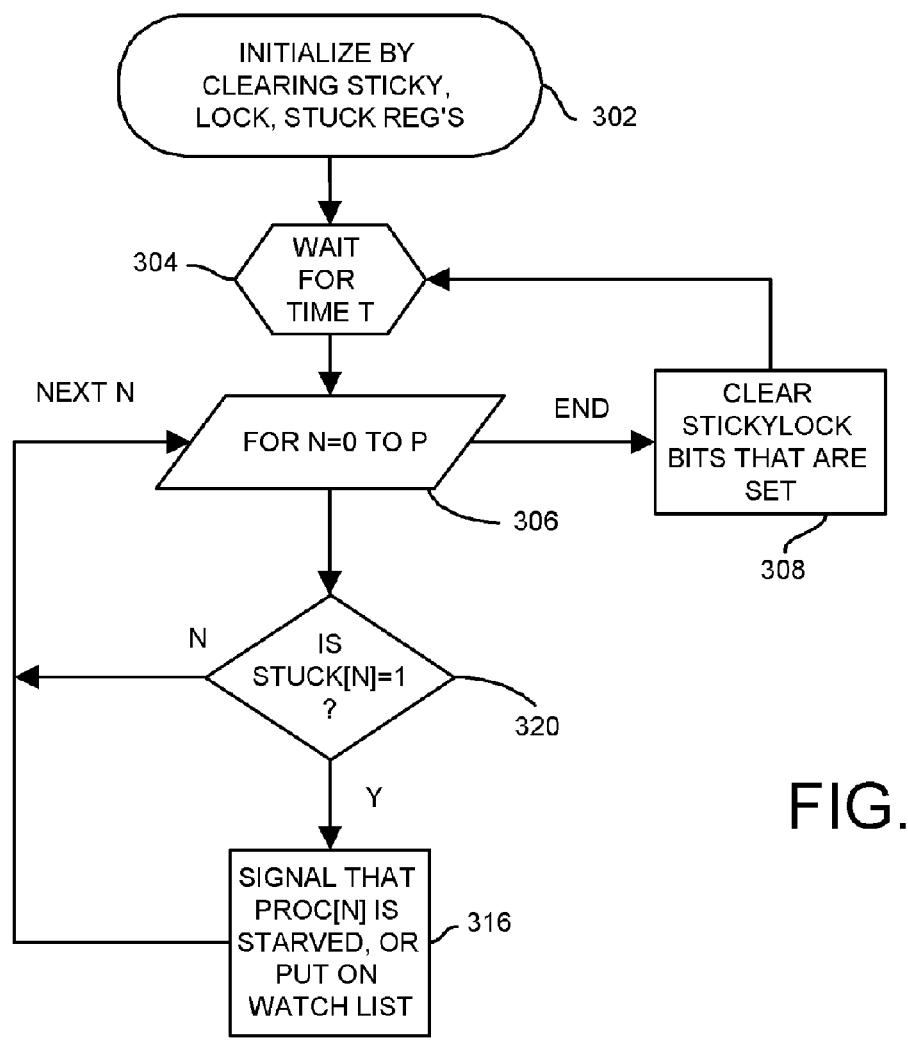
FIG. 8 is a flowchart of steps taken by a streamlined resource-lock monitor that reads stuck bits.

Stuck Bits Simplify Starvation Detection—FIGS. 7-8

FIG. 7 shows stuck, lock, and sticky-lock bits packed into registers read by streamlined resource-lock monitoring software. Lock-Monitor register 60 and sticky-lock-Monitor register 62 operate as described before for FIG. 3. A third register, stuck register 64, is added to simplify starvation detection. A stuck bit is high when the corresponding processor is in the 1,0 error condition of the lock and sticky-lock bits.

The state of stuck bits in stuck register 64 are generated by logic gates 68. Each logic gate 68 combines the lock and the sticky-lock bits for that processor to generate the stuck bit as the logical AND of the lock bit and the inverse of the sticky-lock bit. For example, STUCK_A=LOCK_A AND NOT STICKY_LOCK_A.

Stuck bits in stuck register 64 could be latched or registered every clock cycle from the outputs of logic gates 68, or could be transparent. Only stuck register 64 needs to be read by lock-monitoring software. Registers 60, 62 do not need to be read. The stuck status of many processors may be quickly monitored by reading the multiple stuck bits in register 64.

FIG. 8 is a flowchart of steps taken by a streamlined resource-stuck monitor that reads stuck bits. Lock and stuck registers in a resource-stuck controller are initialized by clearing all stuck, sticky-lock, and stuck bits, step 302. Monitoring is performed after each period of time T, step 304. Time T may be a relatively long period of time, such as 1 millisecond, 100 microseconds, or some other value and may be programmable.

At each monitoring time-point after time T, each processor N is monitored by stepping variable N through from 0 to P, when there are P+1 processors to be monitored, step 306. For each processor N, the stuck bit is read for that processor. The lock and sticky-lock bits do not need to be read. When the processor's stuck bit STUCK[N] is 0, step 320, then the processor is not resource-locked. The next processor can be examined, step 306.

When the processor's stuck bit is set, step 320, then the processor is in the lock-error (1,0) condition of the lock and sticky-lock bits, which are logically combined to form the stuck bit. Since those sticky-lock bits that are read as 1 are cleared after monitoring is completed, the sticky-lock bit has been cleared, and the lock bit has been set, for at least one time period T-S. This time interval may be too long for a processor to be requesting a resource. The stuck monitor signals that this processor is starved or adds it to the monitor watch list for an additionally period of monitor, step 316. After a processor is determined to be starved, error handler 86 may be activated to un-lock or reset the processor, or perform other actions to debug the condition or to allow forward progress. The next processor can be examined, step 306.

Once all processors' stuck bits have been examined, step 306, the clear-sticky signal is activated to clear those sticky bits that are set, step 308. Monitoring is complete until the next time T has passed, step 304 and monitoring is repeated.

Figure 9A:
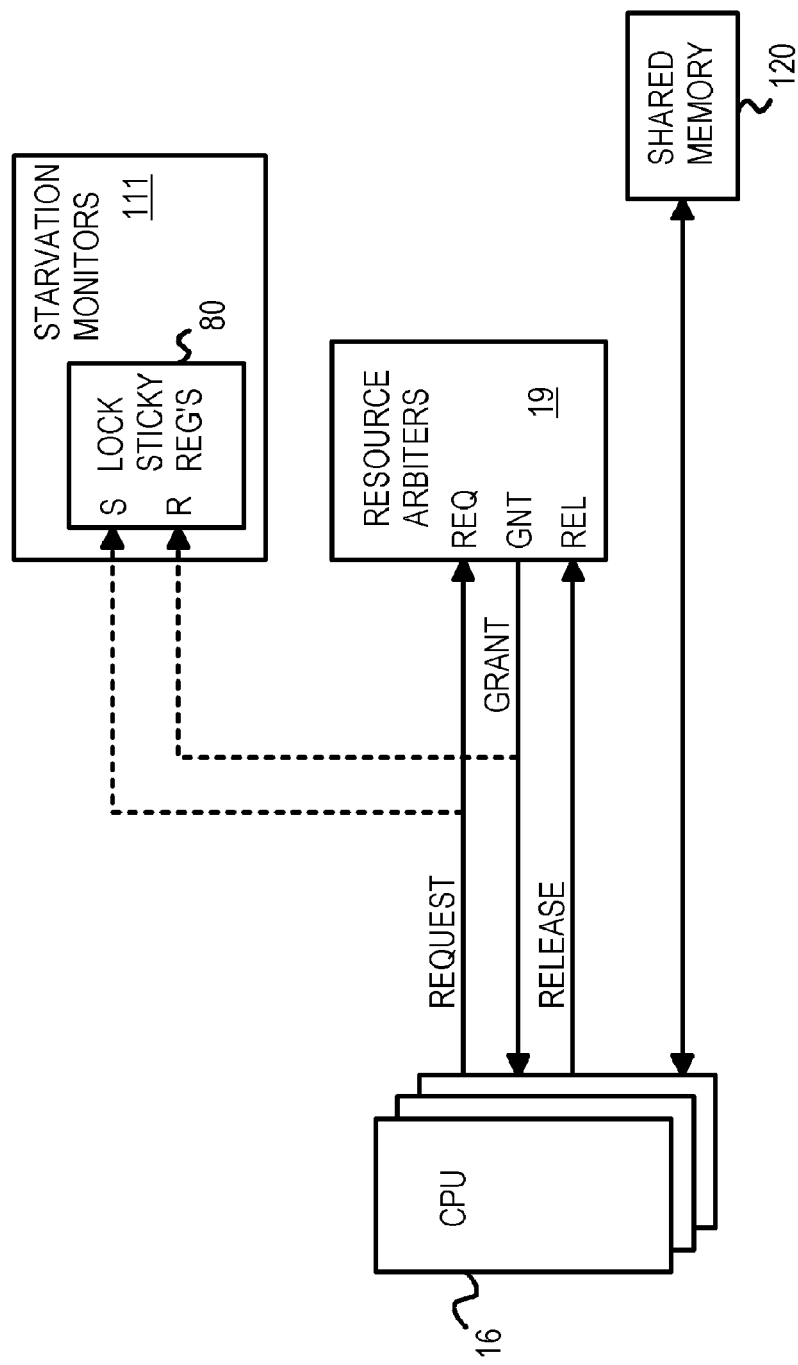
Figure 9C:
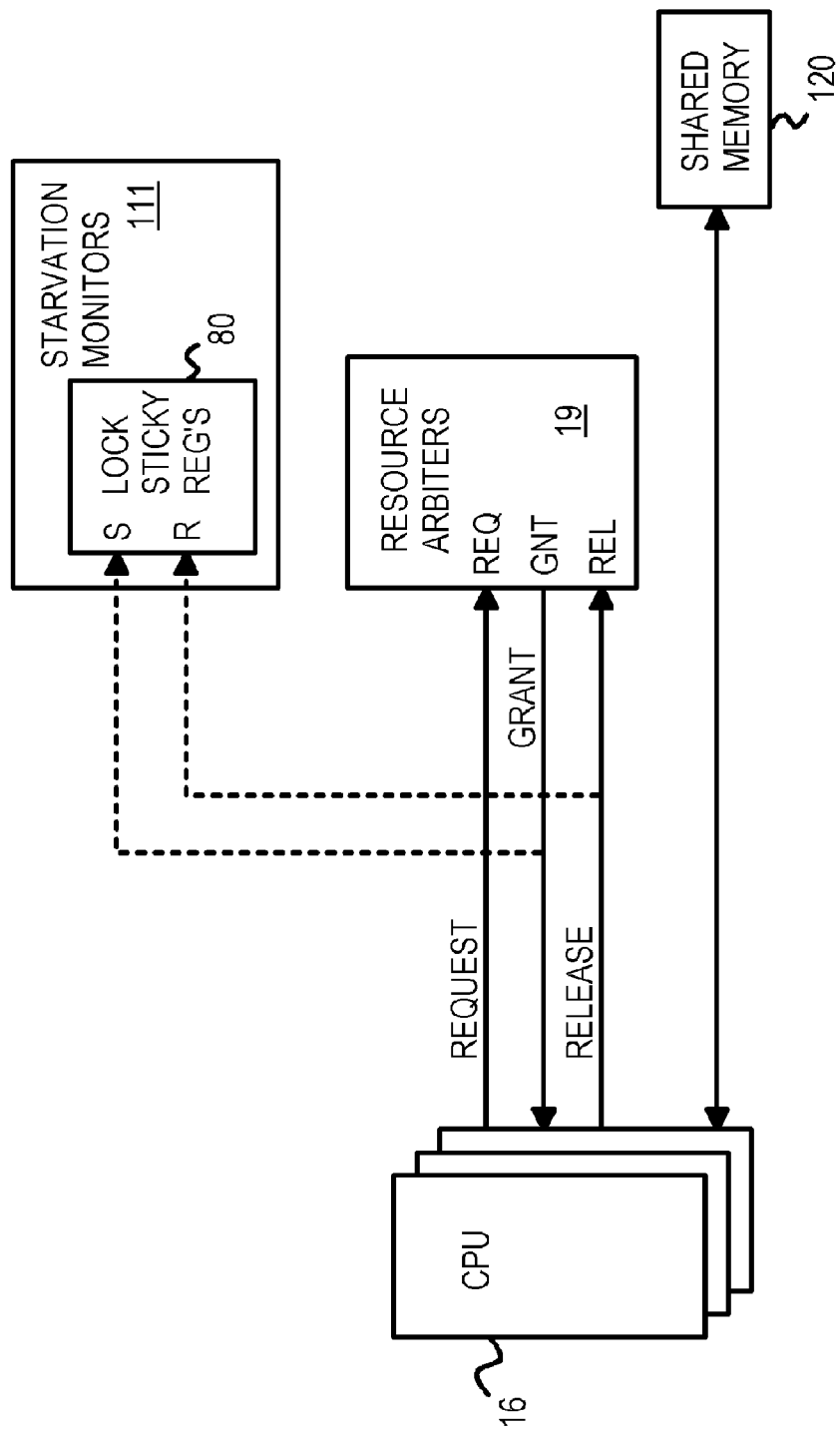

FIGS. 9A-C show alternative set and reset signals to the lock registers that are taken from various arbitration signals. Processors 16 execute a lock instruction that causes a request signal to go high to resource arbiter 19. Resource arbiter 19 responds to the request by arbitrating access to shared memory 120 (or other shared resource), eventually granting access to requesting processor 16 by driving the processor's grant line high. Requesting processor 16 then accesses shared memory 120. When access is complete, requesting processor 16 sends a release signal to resource arbiter 19. Resource arbiter 19 responds by lowering the grant signal to requesting processor 16, and may then grant access to another requesting processor 16.

The release signal REL may be a separate line, or may be combined with the request signal. The request signal being driven low by requesting processor 16 can indicate a release, while the request signal going high indicates a request. Other combinations and variations in arbitration handshake signals are possible.

In FIG. 9A, lock and sticky-lock bits in lock registers 80 are set when the request line REQ goes high. The lock bits are reset in lock registers 80 when the grant line goes high. This is the scheme that has been described earlier. In this scheme resource-lock monitor 111 detects starvation conditions that are caused by resource arbiter 19 never returning the grant, but is does not detect arbitration errors that occur after the grant is returned, such as the requesting processor never releasing the grant back to resource arbiter 19.

In FIG. 9B, lock and sticky-lock bits in lock registers 80 are again set when the request line REQ goes high. However, the lock bits are reset in lock registers 80 when release signal REL is activated, rather than when the grant line goes high.

In this scheme resource-lock monitor 111 detects starvation conditions that are caused by resource arbiter 19 never returning the grant, and also detects later arbitration errors that occur after the grant is returned, such as the requesting processor never releasing the grant back to resource arbiter 19.

In FIG. 9C, lock and sticky-lock bits in lock registers 80 are set when the grant line GNT goes high. The lock bits are reset in lock registers 80 when the release line REL goes high.

In this scheme resource-lock monitor 111 does not detect starvation conditions that are caused by resource arbiter 19 never returning the grant. However, it does detect arbitration errors that occur after the grant is returned, such as the requesting processor never releasing the grant back to resource arbiter 19.

Alternate Embodiments

Several other embodiments are contemplated by the inventors. For example, one pair of lock and stick-lock bits per processor could be used for all the kinds of shared resources, sharing the pair of bits for one or more resource arbiters 19, or separate pairs of bits could be used for each kind of shared resource, or for groups of shared resources, and for each processor.

While the resource-lock monitor has been described as a software program that can be executed on a processor assigned to monitor the system, the monitor software could execute on a specialized processor. The monitor may also be a firmware routine or a hardwired or state-machine-controlled operation. Various combinations may also be substituted.

Software variables may be used for stuck register 64, or may be a copy of the data in hardware-based stuck register 64. Registers may be read-only. Logic gates 68 may be implemented by logic instructions that use an arithmetic-logic-unit (ALU) or other logic units. Hardware latches, registers, and logic gates could also be used. Lock-monitor register 60 and sticky-lock-monitor register 62 could also be read and copied to software variables that are used by resource-lock monitor 82 (FIG. 5). This can eliminate multiple reads of hardware registers. Logical operations can then be performed on the software variables.

Monitoring, logical computations, and checking could be done in parallel for many processors, rather than bit-wise for each processor as shown for steps 106, 306. Clearing of a sticky-lock bit could be accomplished by the monitor software outputting a high to a register that generates the clear-sticky signal, and then outputting a low after a period of time to generate the pulse. Alternately, the clear-sticky pulse may be hardware, firmware, or micro-code generated by execution of an instruction.

Resource-lock controller 100 (FIG. 4) may monitor processors 16 in one or several multi-processor tribes 10, or for a whole system. A single resource arbiter 19 may arbitrate access for all shared resources, or separate resource arbiters 19 may be provided for each shared resource or for subsets of shared resources. Some shared resources may be sub-divided into separately-arbitrated areas or regions, and some shared resources may allow for parallel access, such as for a multi-port memory that may allow two processors to be granted access at the same time, for access over separate memory ports.

In the resource-lock monitoring routine of FIG. 5, individual bits in lock registers 80 may be read for each processor checked, or all bits in lock registers 80 may be read and temporarily stored, and then individual bits examined. Rather than stepping through each processor's bits, bits for all processors could be examined together, such as by AND'ing them together.

Various blocks may be pipelined, and operate at different times on the same data due to pipeline delays. Reference to a certain time-point may refer to different physical times for the memory cells, address decode logic, data latches, arbiters, muxes, monitors, and error handlers. Additional blocks, logic, and functions may be added in various locations. Clocks and counters may be paused or stopped, or may be free-running.

Figure 1:
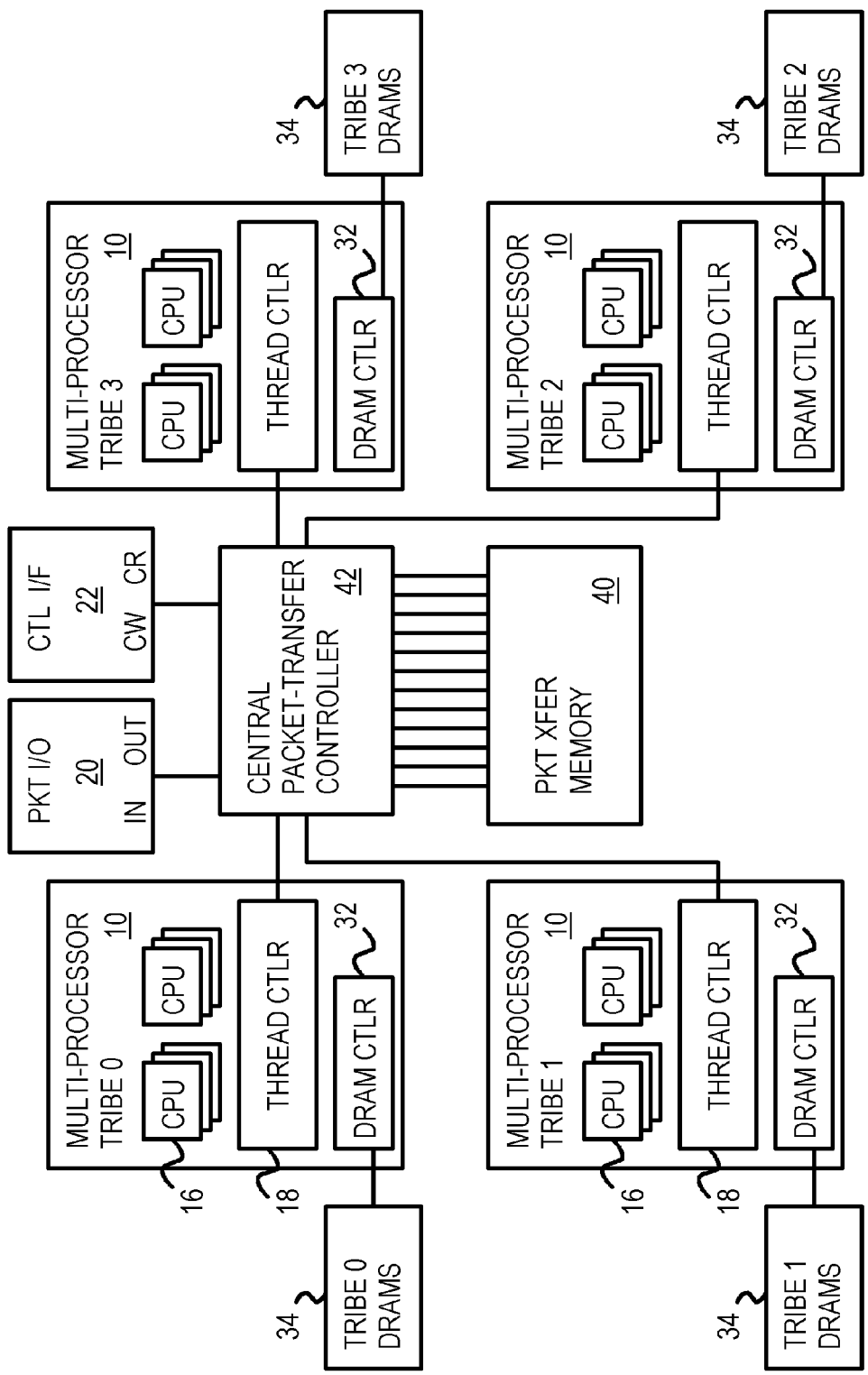
FIG. 1 is a block diagram of a packet processor.

Different numbers and arrangements of processors, tribes, banks, ports, and other design components may be used. While 32 processors per tribe is one embodiment, each tribe could have 8 processors, 16 processors, or some other number of processors. Processors 16 (FIG. 4) may have local cache memory or may be able to access other memories besides packet-transfer memory 40 of FIG. 1. Processors 16 may use scratch-pad memory or packet memory. Packets may be moved from one memory to another memory, or may initially or finally reside in another memory. Multi-processor tribes 10 may contain many other blocks not shown, such as memory controllers for external memories, interrupt logic and prioritizers, test and debug logic, etc. Packet ordering logic may also be added.

Packet-transfer memory 40 may be part of a larger memory such as an internal static random-access memory (SRAM), DRAM, electrically-erasable programmable read-only memory (EEPROM), or other kind of memory that may include other memories such as an internal packet descriptor table and various buffers.

One or more multi-processor tribes 10 may be integrated together on a single chip with packet-transfer memory 40 and central packet-transfer controller 42 (FIG. 1), or multi-processor tribes 10 may be on separate chips. Various levels of integration and partitioning of blocks are contemplated. Each processor may operate on a separate packet, or multiple processors may operate on a single packet, or various combinations.

Sequences, counting, and arithmetic may be in binary, gray-code, or some other order or coding that does not have to be numerically ascending or descending. A table may be needed to describe an order that is repeated. A round-robin arbitration sequence may follow any sequence of requesters in a deterministic order. Some requesters may have more arbitration slots or time granted than other requesters, and some requesters may appear multiple times in the sequence while other requesters appear only once in the sequence. Time slots may have different lengths. Round-robin is not limited to a binary ordered list and may flip direction of sequencing or jump in the sequence. When all requesters are able to get access to the shared memory over a sequence of time slots, then a worst-case latency can be guaranteed, even if some requesters a give more access time than others.

Other embodiments may use more than one packet interface, or more (or fewer) ports per tribe. Round-robin may be replaced with other kinds of arbitration. Another type of mechanism that deterministically visits all the sources may be substituted for the arbiter.

While the terms set and clear have been used to indicate setting to 1 and clearing or resetting to 0, states could be inverted so that a bit is set to 0 and cleared to 1. Bits could be combined, encoded, inverted, or altered in a variety of ways. The beginning and end of a period of time can be arbitrarily chosen, so the end of a monitoring period may be the beginning of a physical period indicated by a clock or timer, rather than the end of the clock or timer period.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A starvation detector comprising:
   a lock-monitor register having a plurality of lock bits, said lock bits indicating, for a processor in a plurality of processors, the status of a request for access to a shared resource and wait status for access to a shared resource;
   a plurality of sticky-lock bits, in the lock-monitor register, a sticky-lock bit indicating a sticky-lock state when a processor in a plurality of processors had requested access to the shared resource during a prior monitoring period of time;
   a periodic reseter that is activated at an end of each monitoring period to reset the sticky-lock bits that indicate the sticky-lock state in the lock-monitor register to not indicate the sticky-lock state; and
   a resource-lock monitor, coupled to the lock-monitor register, the resource-lock monitor being activated to read the lock-monitor register during each monitoring period, the resource-lock monitor identifying a stuck processor in the plurality of processors when the lock bit for the stuck processor indicates that the stuck processor is waiting for access to the shared resource, but the sticky-lock bit for the stuck processor is not in the sticky-lock state;
   a resource arbiter that receives requests from the plurality of processors for access to the shared resource, the resource arbiter determining a selected processor from a plurality of requesting processors in the plurality of processors, the plurality of requesting processors all currently requesting access to the shared resource;
   wherein the resource arbiter sends a grant to the selected processor to allow the selected processor to access the shared resource;
   wherein a lock bit in the lock-monitor register is cleared in response to the selected processor releasing the grant back to the resource arbiter to indicate that the selected processor is no longer accessing the shared resource,
   whereby the stuck processor waiting for access to the shared resource is identified by a combination of the lock bit and the sticky-lock bit for the stuck processor read from the lock-monitor register with the plurality of lock and sticky-lock bits for the plurality of processors.

2. The starvation detector of claim 1 wherein said lock bit in the lock-monitor register is cleared in response to the selected processor receiving the grant from the resource arbiter to indicate that the selected processor is no longer waiting for access to the shared resource;

wherein said lock bit in the lock-monitor register is set to indicate that the selected processor has requested access to the shared resource when the selected processor executes a lock instruction.

3. A starvation detector comprising:

a lock-monitor register having a plurality of lock bits, said lock bits indicating, for a processor in a plurality of processors, the status of a request for access to a shared resource and wait status for access to a shared resource;

a plurality of sticky-lock bits, in the lock-monitor register, a sticky-lock bit indicating a sticky-lock state when a processor in a plurality of processors had requested access to the shared resource during a prior monitoring period of time;

a periodic reseter that is activated at an end of each monitoring period to reset the sticky-lock bits that indicate the sticky-lock state in the lock-monitor register to not indicate the sticky-lock state: and a resource-lock monitor, coupled to the lock-monitor register, the resource-lock monitor being activated to read the lock-monitor register during each monitoring period, the resource-lock monitor identifying a stuck processor in the plurality of processors when the lock bit for the stuck processor indicates that the stuck processor is waiting for access to the shared resource, but the sticky-lock bit for the stuck processor is not in the sticky-lock state;

a resource arbiter that receives requests from the plurality of processors for access to the shared resource, the resource arbiter determining a selected processor from a plurality of requesting processors in the plurality of processors, the plurality of requesting processors all currently requesting access to the shared resource;

wherein the resource arbiter sends a grant to the selected processor to allow the selected processor to access the shared resource;

wherein a lock bit in the lock-monitor register is set in response to the selected processor receiving the grant from the resource arbiter to indicate that the selected processor is no longer waiting for access to the shared resource;

wherein said lock bit in the lock-monitor register is cleared in response to the selected processor releasing the grant back to the resource arbiter to indicate that the selected processor is no longer accessing the shared resource, whereby the stuck processor waiting for access to the shared resource is identified by a combination of the lock bit and the sticky-lock bit for the stuck processor read from the lock-monitor register with the plurality of lock and sticky-lock bits for the plurality of processors.

4. The starvation detector of claim 3 wherein the plurality of processors comprises at least 32 processors;

wherein the lock-monitor register comprises at least 32 lock bits and at least 32 sticky-lock bits to monitor the at least 32 processors.

5. The starvation detector of claim 3 further comprising:

stuck bits in the lock-monitor register, a stuck bit for the selected processor in the plurality of processors being generated from a logical combination of the lock bit and the sticky-lock bit for the selected processor;

wherein the resource-lock monitor is coupled to the stuck bits in the lock-monitor register, the resource-lock monitor not reading the lock bits and the sticky-lock bits in the lock-monitor register;

wherein the resource-lock monitor identifies the stuck processor in the plurality of processors when the stuck bit for the stuck processor indicates a stuck state that indicates that the stuck processor is waiting for access to the shared resource, but the sticky-lock bit for the stuck processor is not in the sticky-lock state, whereby the stuck bits are read by the resource-lock monitor.

6. The starvation detector of claim 5 wherein the selected processor is selected from any processor in the plurality of processors and wherein a number of the stuck bits is equal to a number of processors in the plurality of processors.

7. The starvation detector of claim 5 wherein the logical combination is an AND of the lock bit and an inverse of the sticky-lock bit for the selected processor.

8. The starvation detector of claim 3 wherein the shared resource is a shared memory controlled by a memory controller, a peripheral device on an expansion bus, a global register, a descriptor table, or input or output through an I/O controller.

* * * * *